(12) United States Patent
Borges et al.

(10) Patent No.: US 10,034,224 B2
(45) Date of Patent: *Jul. 24, 2018

(54) DYNAMIC AND ADAPTIVE CHANNEL SCANNING

(71) Applicant: Apple Inc., Cupertino, CA (US)

(72) Inventors: Daniel R. Borges, Cupertino, CA (US); Christiaan A. Hartman, Cupertino, CA (US); Christopher B. Zimmermann, Cupertino, CA (US); Peter N. Heerboth, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/816,908

(22) Filed: Aug. 3, 2015

(65) Prior Publication Data

US 2015/0341850 A1    Nov. 26, 2015

Related U.S. Application Data

(63) Continuation of application No. 13/913,339, filed on Jun. 7, 2013, now Pat. No. 9,100,892.

(51) Int. Cl.
*H04W 48/00* (2009.01)
*H04W 52/02* (2009.01)
(Continued)

(52) U.S. Cl.
CPC .......... *H04W 48/00* (2013.01); *H04W 4/005* (2013.01); *H04W 4/70* (2018.02); *H04W 48/16* (2013.01);
(Continued)

(58) Field of Classification Search
CPC ..... H04W 48/00; H04W 4/005; H04W 48/16; H04W 52/0229; H04W 4/70; Y02B 60/50; Y02D 70/142; Y02D 70/00; Y02D 70/144
(Continued)

(56) References Cited

U.S. PATENT DOCUMENTS 5,436,903 A * 7/1995 Yang ..................... H04L 12/413
370/448
8,542,646 B1 * 9/2013 Ding ..................... H04W 72/02
340/870.04
(Continued)

*Primary Examiner* — Obaidul Huq
(74) *Attorney, Agent, or Firm* — Sterne, Kessler, Goldstein & Fox, PLLC

(57) ABSTRACT

Methods and apparatus for dynamic, adaptive scanning of communication channels are provided. A device alternates between scan cycles and rest cycles. A scan cycle includes interleaved intervals of scanning and resting. A scan interval may involve active or passive scanning, and a rest interval may be active or inactive. An active rest interval is spent tending to a communication requirement other than scanning (e.g., an infrastructure connection, a peer-to-peer connection). An inactive rest interval may be spent in a low-power mode of operation. Rest cycles, like rest intervals, may also be active or inactive. Durations of rest cycles and rest intervals increase each time a scan cycle completes without detection of any significant event or signal (e.g., until they reach a maximum). Upon detection of a significant event, they decrease, possibly by being reset to default durations.

16 Claims, 8 Drawing Sheets

(51) Int. Cl.
*H04W 4/00* (2018.01)
*H04W 4/70* (2018.01)
*H04W 48/16* (2009.01)

(52) U.S. Cl.
CPC ......... *H04W 52/0229* (2013.01); *Y02D 70/00* (2018.01); *Y02D 70/142* (2018.01); *Y02D 70/144* (2018.01)

(58) Field of Classification Search
USPC .................. 370/310, 315, 316, 319, 320
See application file for complete search history.

(56) References Cited

U.S. PATENT DOCUMENTS

2010/0267380 A2* 10/2010 Montemurro ......... H04W 48/16
                                                    455/434
2010/0299743 A1* 11/2010 Xu ...................... H04L 29/125
                                                    726/14
2013/0165113 A1*  6/2013 Oroskar ................ H04W 60/00
                                                    455/434

* cited by examiner

DYNAMIC AND ADAPTIVE CHANNEL SCANNING

RELATED APPLICATIONS

The instant application is a continuation of, and hereby claims priority to, pending U.S. patent application Ser. No. 13/913,339, which was filed on 7 Jun. 2013, and which is incorporated by reference.

BACKGROUND

Apparatus and methods are provided for dynamic and adaptive scanning of communication channels.

Wireless computing and communication devices regularly scan communication channels to locate devices and services (e.g., Bluetooth® devices), identify available communication connections (e.g., Wi-Fi®) and/or for other reasons. Each of multiple communication functions, services or applications operating on a device may request scans, on the same or different channels, of the same or different types (e.g., active, passive) and at various times, thereby placing fluctuating demands on the device's communication resources.

The more scans a device must perform, the more power it consumes. Adding to the inefficiencies, a scan for one purpose (e.g., one service or application) will sometimes target a channel that was recently scanned for some other purpose, thereby causing wasteful redundancy.

In addition, services and applications that initiate channel scans generally are not designed to do so in an adaptive manner that accommodates or adjusts to variations in communication activity. For example, a typical service or application may request scans with the same frequency regardless of whether recent scans have revealed nothing of interest or have revealed many available connections or devices. For example, in a highly dynamic environment a device may encounter an ever-changing communication topography, with different devices and network connections appearing and disappearing in fairly rapid succession. If the device continues scanning with a relatively long periodicity, it may miss some significant opportunities.

In summary, each of multiple communication applications and services installed on a portable communication device or computing device attempts to satisfy its own requirements or desires for scanning, independent of other applications and services, and does not attempt to adjust its scan requests to promote efficient use of the device's communication resources. Therefore, the device's operating system and the communication resources are subject to inefficient usage as they attempt to meet each distinct request.

SUMMARY

In some embodiments, apparatus and methods are provided for dynamically and adaptively scanning communication channels (e.g., wireless 802.11 channels). In these embodiments, the device schedules and conducts alternating scan cycles and rest cycles.

During a scan cycle, the device alternates between scan intervals and rest intervals. A scan interval involves a scan of one channel, either actively or passively, although a passive scan may change to an active scan if a signal of interest is received. A rest interval may be active in nature, with the device tuned to an infrastructure channel (e.g., to maintain a Wi-Fi connection), an off-channel (e.g., to maintain a peer-to-peer connection) or some other channel, or may be inactive, with the device in a low-power mode of operation to conserve energy. A rest cycle follows each scan cycle and may also be spent actively or inactively.

In these embodiments, if a scan cycle completes with no significant activity or event, a succeeding rest cycle and/or rest intervals in the next scan cycle may be extended in duration. Illustratively, default values for the rest periods are multiplied by the same value or by different values. Each successive cycle of scans that detects on significant activity may cause further extension to the rest cycles and/or rest intervals (either or both of which may have maximum values). However, when an event of interest is detected during a scan, the durations of rest cycles and/or rest intervals may immediately return to their default lengths, or they may be decreased by some amount.

In some embodiments, events of interest may include things such as receipt of a manual scan request from a user, a scan request from an application or service (e.g., if that request cannot be satisfied with results of a recent scan), sensor input (e.g., fluctuating signal strength is detected on an infrastructure connection, accelerometer data indicate the device has been placed in motion) and/or other events.

DETAILED DESCRIPTION

Figure 1:
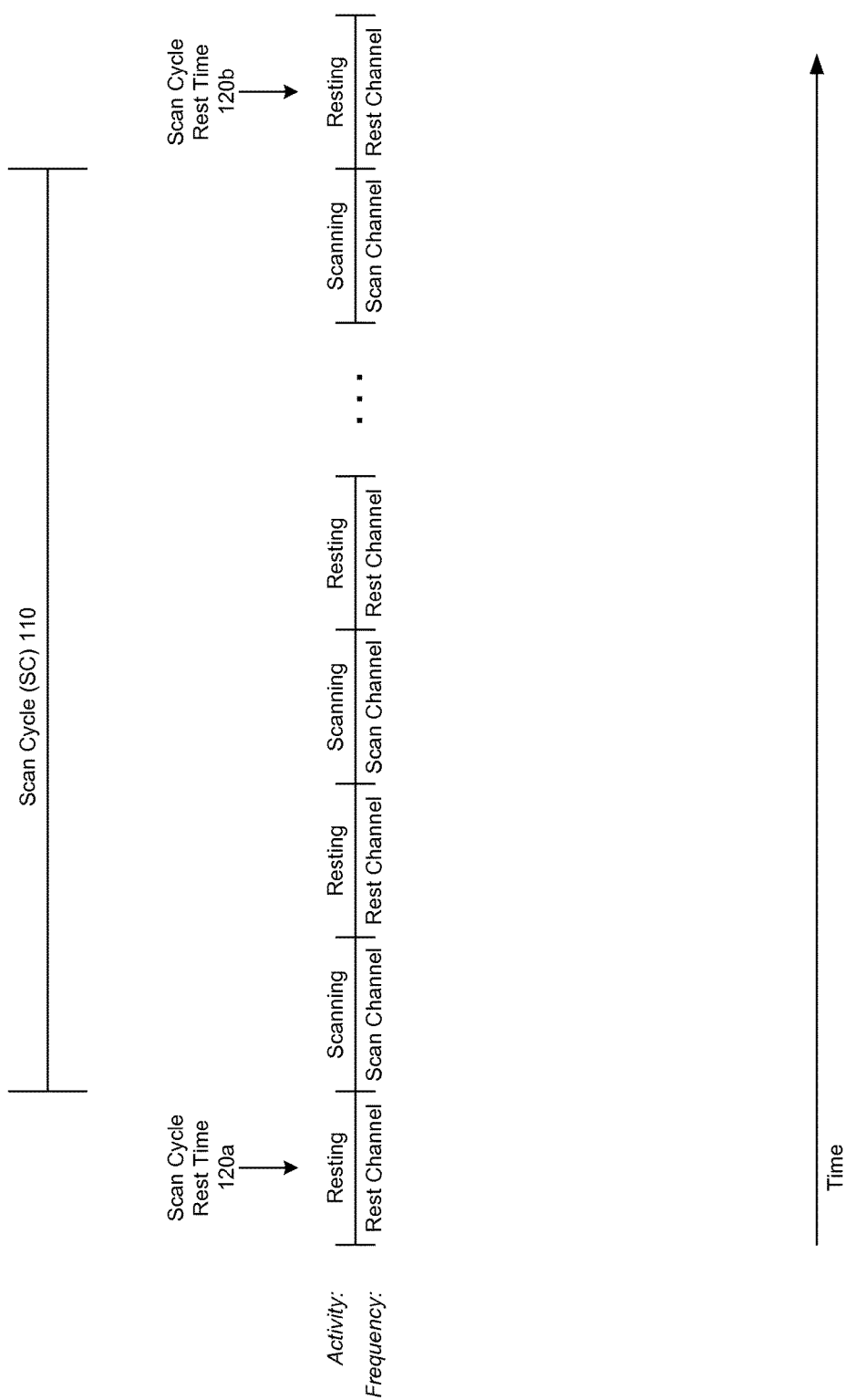
FIG. 1 is a block diagram depicting a model scan cycle, in accordance with some embodiments.

Various modifications to the disclosed embodiments will be readily apparent to those skilled in the art, and the general principles defined herein may be applied to other embodiments and applications.

In some embodiments, methods and apparatus are provided for scanning communication channels. In these embodiments, a computing or communication device hosts multiple applications and/or services that require scanning any number of communication channels to identify available communication connections (e.g., Wi-Fi® connections), devices (e.g., Bluetooth® devices, peer-to-peer partners), services offered by other devices, etc. Although embodiments are described as they may be implemented to scan channels in the context of Wi-Fi technology (i.e., IEEE 802.11 technologies such as IEEE 802.11a/b/g/n/ac, and/or other IEEE 802.11 technologies), these embodiments may be readily adapted to support scanning of other types of communication channels, as will be readily perceived by one of ordinary skill in the art.

In some embodiments, a wireless device (e.g., a smart phone, a portable computer) scans a sequence of communication channels identified by one or more communication functions. As used herein, a "function" or "communication function" refers to an entity that requests a channel scan, which may be a discrete application or service executing on the device, or may be the device's operating system or an element thereof. Any number of communication functions may initiate any number of requests for channel scans on any number of channels.

In these embodiments, the device may combine multiple channel scan requests, may respond to one request with information obtained while satisfying a different channel scan request, may drop a redundant request and/or take other action to perform channel scans. For example, if a repeating series or sequence of channel scans provides information needed by a communication function that makes frequently repeated scan requests, those requests may be ignored or may be satisfied with the results of the repeating scans.

In some embodiments, a sequence of activity that includes scanning one or more communication channels and pausing or resting between scans is dynamically adjusted based on events or triggers detected during the scans. For example, the fewer events detected, the more time the device may rest between scans, which may allow it to satisfy other communication requirements or to enter a low-power mode of operation and thereby conserve energy.

Therefore, dynamic and adaptive methods of channel-scanning provided herein promote conservation of power, allow minimization or elimination of redundant scans, and promote co-existence of conflicting communication functions, while supporting infrastructure communications (e.g., Wi-Fi connections), peer-to-peer communications with other devices, interaction with affiliated devices (e.g., via Bluetooth), and/or other communication demands.

In embodiments, a device alternates between scanning a specified set of channels and resting (or pausing). The time spent scanning is referred to as "dwell time" and is spent tuned to the channel(s) being scanned. Dwell time may be "active" or "passive" in nature, depending on whether the scanning being performed during that time is active or passive. Each channel that is scanned is called a "scan channel." A "scan cycle" is a sequence of scans of one or more predetermined channels, which may be called the "scan channel set," interleaved with rest times.

The time the device spends resting is called "rest time." Rest time periods are interleaved with scan time periods during a scan cycle, and may be characterized as "active rest time" (ART) or "inactive rest time" (IRT). During active rest time, the device's radio is on and may be tuned to a "home channel" (HC) used by an infrastructure or Wi-Fi connection, a "peer channel" (PC) used for a peer-to-peer communication connection, or some other channel used for a purpose other than scanning. Thus, during ART periods, the device may satisfy communication requirements other than scanning. During inactive rest time, the device's radio may be turned off (i.e., the device is in a low-power mode).

One scan cycle is separated from the next by a scan cycle rest time (SCRT) period that could be active or inactive. The duration of scan cycle rest time periods and/or rest time periods within a scan cycle dynamically fluctuate depending on significant events that occur and/or signals detected during one or more preceding scan cycles (collectively referred to as "events").

FIG. 1 depicts a model sequence of activity related to one scan cycle, according to some embodiments.

In FIG. 1, a single scan cycle 110 is shown to be an alternating pattern of scanning and resting intervals. Scan cycle 110 is bracketed by scan cycle rest time (SCRT) periods 120a, 120b. Scan channels depicted in FIG. 1 may be the same or different channels and, if different, may be on the same or different frequency bands (e.g., 2.4 GHz, 5 GHz). Similarly, the rest channels may be the same or may differ, and may include one or periods spent in a low-power mode of operation.

Figure 2:
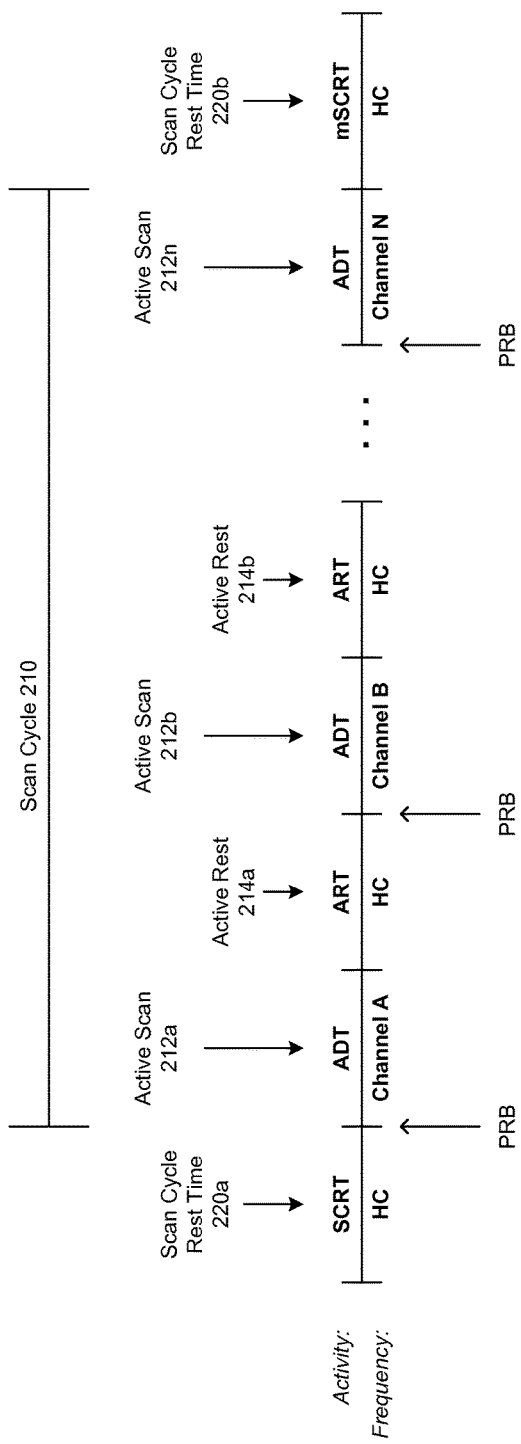
FIG. 2 is a diagram of an illustrative scan cycle, in accordance with some embodiments.

FIG. 2 depicts a sample scan cycle, according to some embodiments. In these embodiments, a device is associated with an infrastructure basic service set (BSS) and therefore must make regular contact on a home channel (HC). The device is performing active scans on a scanning channel set that includes at least channels A, B and N. The scans may have been requested by any function(s) operating on the device, and the scan channel set may include scan channels identified in different scan requests from different functions, or may be just a set of channels identified in a single request.

Scan cycle 210 of FIG. 2 includes active scan intervals 212a, 212b and 212n on scan channels A, B and N, respectively. Each active scan consumes approximately equal amounts of time, which is active dwell time (ADT). The active scans are separated by active resting time (ART) intervals during which the device's radio is tuned to the home channel and can support the infrastructure connection. Active rest intervals 214 (i.e., rest periods 214a, 214b) may be of equal or approximately equal duration.

In these embodiments, each active scan commences with transmission of a probe request bundle (PRB) on the scan channel. In some implementations, multiple probe request bundles may be issued during one active scan 212. In these implementations, the probe bundles may be spaced approximately equally across the scan's active dwell time.

Each probe request bundle comprises one or more probe requests. Each probe request targets a specific SSID (Service Set Identifier) or is a broadcast probe request that is applicable to any service set on the scan channel. The SSIDs associated with the probe requests may include networks with which the device has been connected, the user's preferred networks, etc.

Prior to scan cycle 210, scan cycle rest time 220a is equal in duration to a default scan cycle rest time period. However, because no relevant events were detected during the scans conducted within scan cycle 210, scan cycle rest time 220b (which follows scan cycle 210) is longer in duration. The duration of this modified SCRT is denoted mSCRT and is calculated by multiplying the default SCRT duration by an appropriate modifier (e.g., the "SCRT multiplier").

In some embodiments, the duration of mSCRT periods may continue to increase each time another successive scan cycle completes with no detected events, possibly until it reaches a maximum rest time, at which point it remains constant until decreased for some reason. In these embodiments, the same multiplier applied when the default SCRT duration is increased to mSCRT is applied again each time mSCRT is further increased.

In other embodiments, different multipliers may be applied to scan cycle rest time periods. For example, over time, successively smaller (or larger) multipliers may be applied to the previous mSCRT. In yet other embodiments, only one mSCRT value is used. In these embodiments, SCRT is multiplied once by a back-off multiplier to yield mSCRT, which will not be further increased.

Illustratively, when a modified scan cycle rest time is in effect, as soon as a triggering event is detected during a scan cycle the default SCRT duration is again applied. Thus, embodiments allow for increases in rest time between scan cycles, but enforce a rapid return to a default, minimal duration when activity is detected. Alternatively, however, mSCRT may be returned to the default SCRT over multiple steps instead of a single reset operation.

Just as rest time periods between scan cycles may be dynamically adjusted over time, rest time intervals within a scan cycle may similarly fluctuate in duration. The same multipliers used to calculate modified scan cycle rest time durations may be used to calculate modified active and inactive rest time durations (e.g., mART, mIRT), or different modifiers may be used.

Modified rest time durations generally remain in effect (or are increased) until eventually reset to their default values because a significant event is detected. However, if the configuration of a scan cycle changes while modified rest time intervals are in effect, the new configuration may employ active and inactive rest time intervals of default duration (e.g., especially if a different scan channel set is now in use).

Events that may reset the durations of rest times include, but are not limited to, things such as: a user manually requesting a scan (e.g., via an active communication application), some other user interaction with the device (e.g., while the device is hibernating), turning on a Wi-Fi client; a fluctuation in sensor input or status, receipt of a scan request from a communication function (e.g., if the device is configured to allow or act on scan requests from that function), and a host-commanded reset caused by actions other than those already mentioned.

A fluctuation in sensor input that counts as a triggering event may include, for example, a variation in RSSI (Received Signal Strength Indicator) for a Wi-Fi connection or a change in accelerometer output, either of which may indicate that the device is in motion and therefore may be transiting an area of a new communication network.

In embodiments reflected in FIG. 2, ADT and PDT have static durations, and are not adapted or adjusted when rest time periods are lengthened or shortened. In other embodiments, however, their durations may indeed fluctuate. For example, when active and/or inactive rest times are extended, the length of active and/or passive scan intervals may decrease such that the length of a scan cycle does not change.

Figure 3:
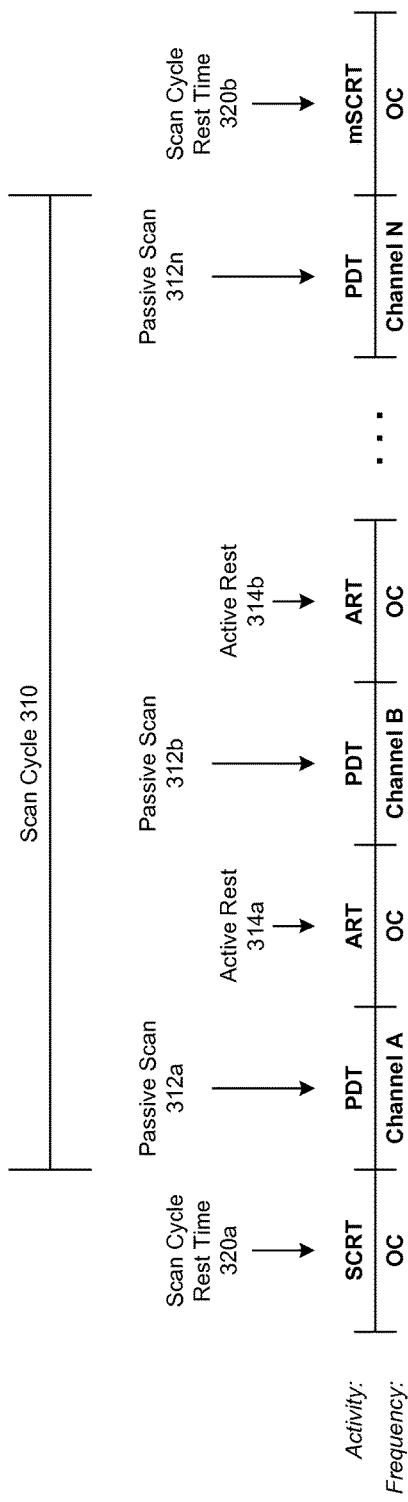
FIG. 3 is a diagram of an illustrative scan cycle, in accordance with some embodiments.

FIG. 3 depicts a sample scan cycle, according to some embodiments. In these embodiments, a device does not have an active infrastructure connection, but is participating in a peer-to-peer network or communication connection on an off-channel (OC). The device is performing passive scans on a scanning channel set that includes at least channels A, B and N.

In particular, scan cycle 310 includes passive scan intervals 312a, 312b and 312n on scan channels A, B and N, respectively. The passive scans consume approximately equal amounts of time, designated as passive dwell time (PDT). The passive scans are separated by active resting time (ART) periods during which the device's radio is tuned to the off-channel and can support the peer-to-peer connection. Active rest intervals 314 (i.e., rest periods 314a, 314b) are of equal or approximately equal duration.

Because no notable communication events were detected during passive scans 312, modified scan cycle rest time 320b that follows scan cycle 310 is longer than scan cycle rest time 320a, which may be of default duration. The same (or different) multiplier may be used to calculate mSCRT 320b as was used to calculate mSCRT 220b of FIG. 2.

In embodiments depicted in FIGS. 2 and 3, if the featured device had not been active on an infrastructure, peer-to-peer or other communication channel, the active resting time (ART) periods of the illustrated scan cycles and/or the scan cycle rest time (SCRT) periods could have been replaced by inactive resting time (IRT) intervals, which may be equal in duration to the ART, but which are spent with the device in a low-power mode.

Figure 4:
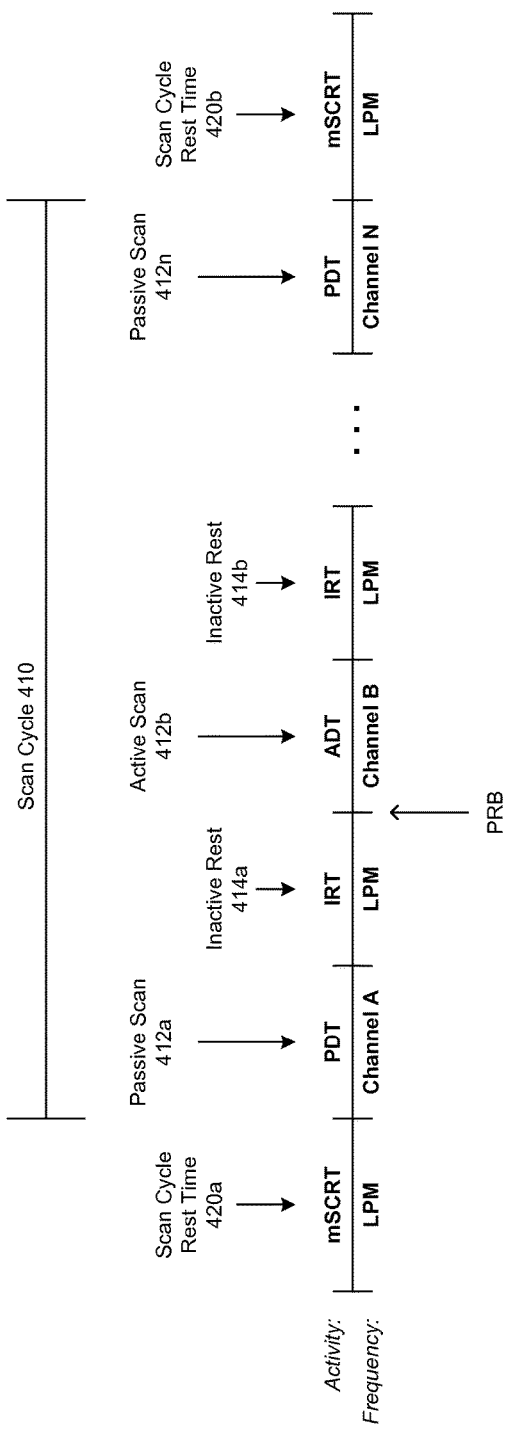
FIG. 4 is a diagram of an illustrative scan cycle, in accordance with some embodiments.

FIG. 4 depicts a sample scan cycle, according to some embodiments. In these embodiments, a device does not have any active communication connections that require it to tune to a home channel or an off-channel, but the device is performing active and passive scans on a scanning channel set that includes at least channels A, B and N.

In particular, scan cycle 410 includes passive scan intervals 412a, 412n and active scan interval 412b on scan channels A, N and B, respectively. One probe request bundle is illustrated in conjunction with active scan 412b. Each scan may consume equal or approximately equal amounts of time, designated as passive dwell time (PDT) and active dwell time (ADT). Alternatively, however, PDT may be longer than ADT. The scan intervals are separated by inactive resting time (IRT) periods during which the device's radio is powered off or is in a low-power mode. Inactive rest intervals 414 (i.e., rest periods 414a, 414b) are of equal or approximately equal duration.

Because no notable communication events were detected during scans 412, modified scan cycle rest time 420b that follows scan cycle 410 is longer than modified scan cycle rest time 420a, which itself is longer than the previous (or default) scan cycle rest time. The same (or different) multiplier may be used to calculate mSCRT 420b as was used to calculate mSCRT 420a.

In some embodiments, illustrative durations of time periods mentioned above and/or depicted in the figures may be as follows. A default active dwell time may be on the order of 40 milliseconds (ms), but may range from 0-100 ms as a multiplier is applied during successive cycles having no significant events. A default passive dwell time may be on the order of 110 ms, but may range from 0-500 ms. Default active and inactive rest times may be approximately 500 ms, but may range from 0-5000 ms. A default scan cycle rest time may be approximately 16 seconds, but may range to a wide degree, such from 5 seconds to multiple minutes (e.g., 16 minutes). Thus, each time period may start with a different default duration and may increase in duration according to different multipliers until reaching maximum durations or being reset.

Figure 5:
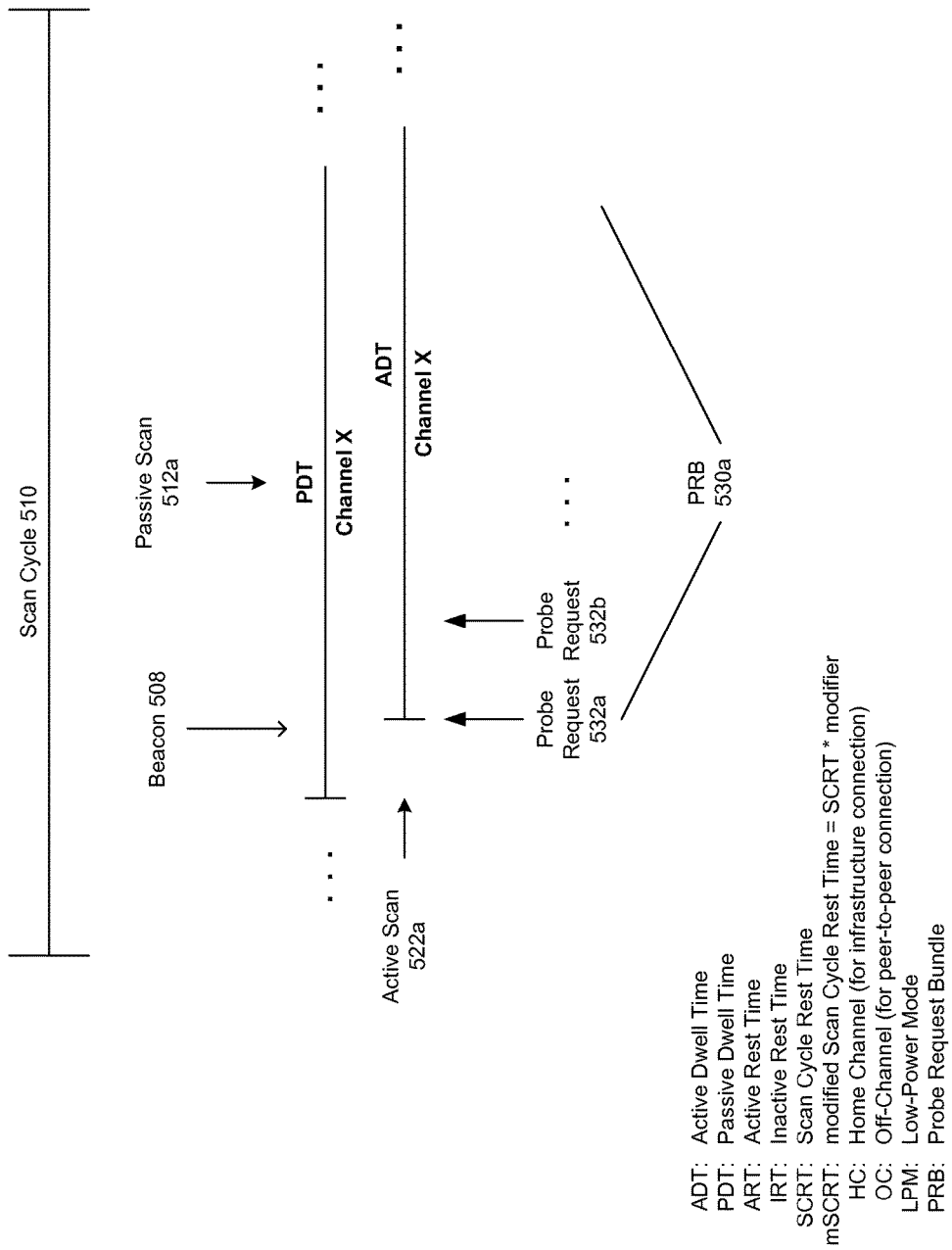
FIG. 5 is a diagram of an illustrative portion of a scan cycle, in accordance with some embodiments.

FIG. 5 depicts a portion of a sample scan cycle, according to some embodiments. In these embodiments, a device is performing a passive scan on a scanning channel, which transforms into an active scan session when a beacon, a probe response, a management frame or other notable signal is received on that channel.

Scan cycle 510 includes passive scan 512a, which proceeds without incident until beacon 508 is received partway through the passive dwell time. In response, the device initiates active scan 522a and issues probe request bundle 530a, which includes probe requests 532 (e.g., probe requests 532a, 532b). As described previously, any number of probe requests may be included in a PRB, and any number of PRBs may be issued during an active scan. Thus, PRB 530a may be followed by one or more additional PRBs. For example, after sending the last probe request 532 of probe request bundle 530a, the device may repeat the same PRB.

The ellipses illustrated in FIG. 5 for passive scan interval 512a and active scan interval 522a signify that the scans may end differently in different implementations or scenarios. In particular, termination of the scan of channel X will depend upon whether the active scan, if allowed to run normally, would complete before the scheduled end of the passive scan.

In one scenario, active scan interval 522a completes before the scheduled end of passive scan 512a. In this scenario, the passive dwell time (PDT) of passive scan 512a shrinks to match the end of the active dwell time (ADT) of active scan 522a, meaning that the scan of channel X is complete at the end of the ADT instead of the end of the PDT. The scheduled remainder of the PDT may be spent resting (actively or inactively) or may be ceded to some other communication function.

In a second scenario, the PDT of passive scan interval 512a is scheduled to end before active scan 522a would terminate if allowed to run its normal duration. In this scenario, the scan of channel X terminates at the end of the PDT, even though the active scan may not have completed.

Thus, in either scenario, after the passive scan is transformed into an active scan, the entire channel scan will terminate at the end of the first dwell time that expires. In both scenarios, after the channel X scan, scan cycle 510 may proceed to the following rest time interval (which will therefore be longer in duration), depending on whether the scan cycle was scheduled to end at the termination of the scan of channel X. If passive scan interval 512a was the last scheduled scan of cycle 510, the entire cycle would end as described above and the following scan cycle rest time would commence.

Figure 6:
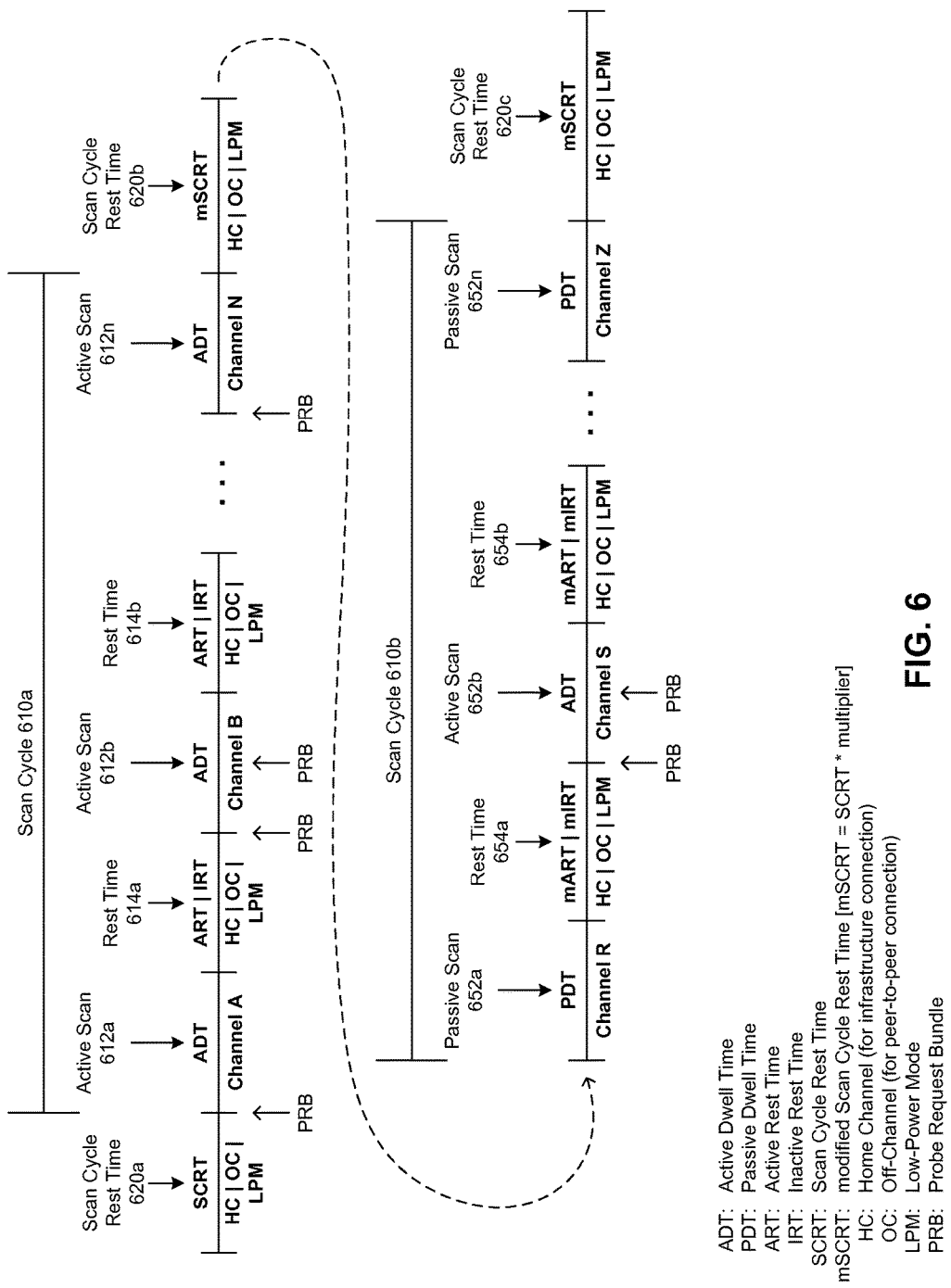
FIG. 6 is a diagram of multiple illustrative scan cycles, in accordance with some embodiments.

FIG. 6 depicts a sequence of two scan cycles, according to some embodiments. In these embodiments, a first scan cycle (cycle 610a) involves active scans on each scan channel; a second scan cycle (cycle 610b) involves a mix of active and passive scans. Because no notable events are detected during the channel scans, the scan cycle rest times increase from a default duration of SCRT in scan cycle rest time 620a, to a first mSCRT 620b, which further increases in duration to mSCRT 620c.

Intra-cycle rest time intervals 614, 654 are genericized to indicate that they may be active or inactive in nature, and may occur while the device's radio is tuned to a home channel, an off-channel, some other channel, or is in a low-power mode. As with the scan cycle rest times, the intra-cycle rest times increase in duration from scan cycle 610a to scan cycle 610b, represented as mART and mIRT. As discussed before, the multiplier that is applied to a default ART duration to produce a modified ART duration (i.e., mART), and/or applied to a default IRT duration to produce a modified IRT duration (i.e., mIRT), may be the same as or different than the multiplier used to increase the duration of SCRT 620a to the duration of mSCRT 620b or the multiplier used to increase mSCRT 620b to mSCRT 620c.

Figure 7:
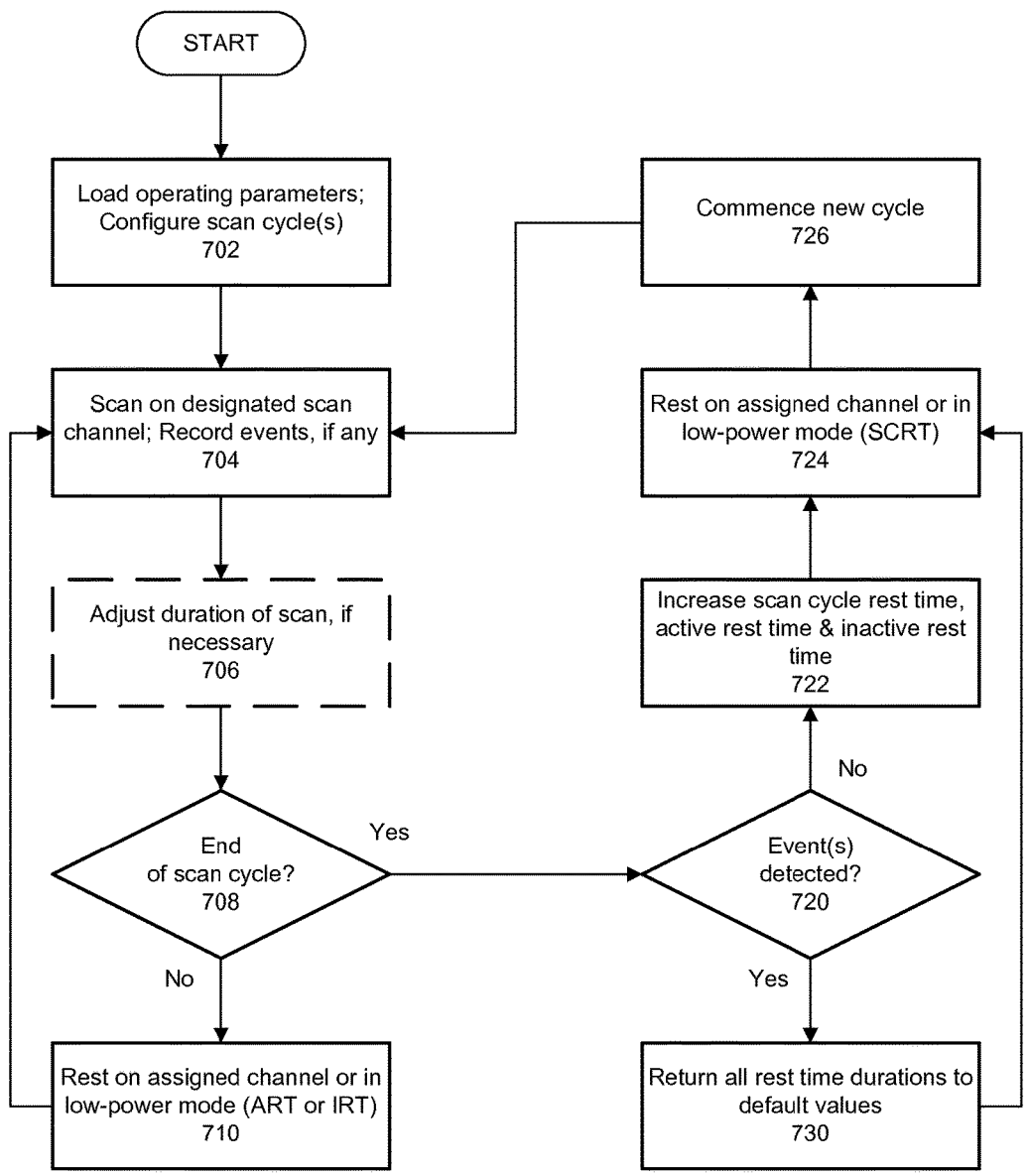
FIG. 7 is flow chart illustrating a method of dynamically and adaptively scanning communication channels, in accordance with some embodiments.

FIG. 7 is a flow chart demonstrating a method of dynamically and adaptively scanning communication channels, according to some embodiments.

The illustrated method may serve to satisfy scan requests and requirements of multiple communication functions executing on a portable computing or communication device. The device may coalesce multiple scan requests (e.g., if multiple requests for a scan on one channel are received in a short period of time), may provide results of a recently completed scan in response to a new scan request targeting the same channel, may ignore a duplicate/redundant request or a request from a function that issues scan requests too frequently, and/or take other steps to increase the efficiency with which it conducts channel scans.

In operation 702, operating parameters for conducting one or more scan cycles are loaded into memory. The scanning process may involve scheduling just one scan cycle, or multiple successive cycles at once. The illustrated process may be performed before a first scanning operation of the device (e.g., when it is turned on), and/or may be performed during a scan cycle (or during a scan cycle rest time period) to prepare for the next cycle.

The operating parameters may include, but are not limited to, any of the following: default dwell time durations for active and/or passive scans (i.e., ADT and PDT), default active and inactive rest time durations (i.e., ART and IRT), a default scan cycle rest time duration (i.e., SCRT), a first multiplier for increasing (or decreasing) a scan cycle rest time duration, a second multiplier for increasing (or decreasing) an active or inactive rest time duration, a scan multiplier for decreasing (or increasing) active or passive dwell time, one or more scan channels (e.g., a scan channel set), a number (or maximum number) of scan cycles to perform, a home channel, an off-channel and/or others.

Once a parameter is loaded, it may only be re-loaded if and when it changes. For example, if a different scan channel set is to be scanned, the new channels must be loaded; if the default scan cycle rest time (SCRT) period changes in duration (e.g., to mSCRT), the new value will be loaded.

In some embodiments, a scan channel set includes all channels for which specific scan requests were received within some period of time (e.g., the last day, the last 12 hours), all channels on which some communication was exchanged within a period of time, channels identified by all (or certain) communication functions, etc.

Also in operation 702, the first or next scan cycle is configured. For example, scan channels may be scanned in the order placed in the scan channel set, in numerical order, in random order or according to some other plan, and the device (e.g., program code configured to perform the dynamic, adaptive scanning) will plan the scan cycle appropriately. Configuration of the scan will therefore determine the order in which members of the scan channel set are scanned, whether a scan interval will be active or passive, how long to dwell on each scan channel, how long to rest between scans and where (e.g., home channel, off-channel, low-power mode), etc.

In operation 704, a scan cycle commences with a scan of the first programmed scan channel. The scan may be active or passive. During an active scan the device generates and sends one or more probe requests on the assigned channel; an individual probe request may target a specific SSID or may be a broadcast type. If included in the probe request bundle, a broadcast probe request may be the last (or first) probe request sent. A probe request bundle may be issued just once during the active dwell time, or may be repeated. In the illustrated method, however, an active dwell time will not be extended regardless of whether all desired probe requests are transmitted by the time the scan interval expires.

During a passive scan, the device may simply listen on the assigned channel for the configured passive dwell time. However, if a beacon, management frame or other trigger signal is received, the passive scan may convert into a regular active scan (possibly of shorter duration than normal) or into a modified active scan that uses a subset of the probe requests that would normally be sent.

Also in operation 704, the device notes or records significant events such as those discussed above (e.g., a manual scan request, a Wi-Fi client is turned on). In the illustrated embodiment, if an event is detected that requires changing the duration of a dwell time or rest time interval, the change may not be implemented until the current scan cycle ends. In other embodiments, a change may be applied immediately (e.g., by loading the default duration parameters).

In optional operation 706, a scan scheduled and commenced as a passive scan may be terminated early if it was converted into an active scan (e.g., in response to a beacon) and the active scan finished before the scheduled PDT expired.

In operation 708, the current scan ends and the subsequent action depends on whether the scan cycle is complete. If the scan cycle has completed, the method advances to operation 720; otherwise, the method continues at operation 710.

In operation 710, the device's radio enters a rest time interval before another scan interval. The rest time may be active rest time and the radio may be tuned to a home channel if the device is associated with a Wi-Fi infrastructure, or the radio may be tuned to an off-channel if the device is participating in peer-to-peer communications. Otherwise, the rest time may be inactive rest time and the radio may enter a low-power mode during which it does not scan and does not attend to either an infrastructure connection or a peer-to-peer connection.

In some embodiments, during a low-power mode of operation communication resources (e.g., a radio) may be used by other communication functions not associated with the scanning. For example, a Bluetooth application or service may use the radio during operation 710 if the rest time is inactive in nature.

After operation 710, the illustrated method returns to operation 704 to start scanning the next scan channel. The illustrated method is implemented as part of an embodiment in which each scan cycle ends with a scan operation, and thus there will be a scan operation after every intra-cycle rest interval.

In operation 720, the device has completed a scan cycle, and therefore determines whether any significant events were detected during the scans. If so, the method advances to operation 730; otherwise, the method proceeds to operation 722.

In operation 722, because no events were detected, durations of all rest time periods are extended. Illustratively, the current (or default) value for each of SCRT, ART and IRT is multiplied by corresponding multipliers, which may or may not differ from one another. That is, a separate multiplier may be specified for each type of rest time, or multiple types may share a multiplier. The modified rest time periods may be referred to as mSCRT, mART and mIRT, respectively.

In some implementations, one or more dwell times may be shortened (e.g., by multiplying ADT and/or PDT by values less than 1.0) instead of, or in addition to, extending any rest times.

In operation 724, a scan cycle rest time is conducted with the new, extended duration (e.g., mSCRT), and may be spent on a home channel to support an infrastructure connection, on an off-channel to support a peer-to-peer connection, in a low-power mode, or attending to another communication requirement.

In operation 726, a new scan cycle commences with configuration of the cycle if it was not configured beforehand. New or updated operating parameters may be loaded as warranted; in particular, the new scan cycle will implement the extended rest times (e.g., mART, mIRT) and/or curtailed dwell times. Operation 726 may occur as part of operation 704 and therefore occur during the scan cycle rest time period. After operation 726, the method returns to operation 704.

In operation 730, because there has been at least one significant event, the method re-loads or resumes use of the default durations for ART, IRT and SCRT (and ADT/PDT if necessary). In other embodiments, instead of returning immediately to the default durations, these time periods may step down in a manner similar to the manner in which they increased. After operation 730, the illustrated method returns to operation 724 to rest for the default or reduced SCRT period and to commence a new scan cycle.

In embodiments in which a device has both an infrastructure connection and an active peer-to-peer communication connection, active rest time periods and/or scan cycle rest time periods may be extended (e.g., doubled) in order to provide the device time to spend on both the home channel and the off-channel. Each function may receive half of the extended rest time, or one may receive a greater portion than the other. As with other embodiments described above, the active and scan cycle rest time periods may still lengthen when a scan cycle encounters no notable events.

Illustratively, in these embodiments the device's main wireless communication interface may be connected to the infrastructure entity (e.g., an access point), while a virtual interface is used for the peer-to-peer functions. If multiple virtual interfaces are implemented (e.g., for other communication functions), rest times may increase even more in order to allow each to tend to its associated function.

Figure 8:
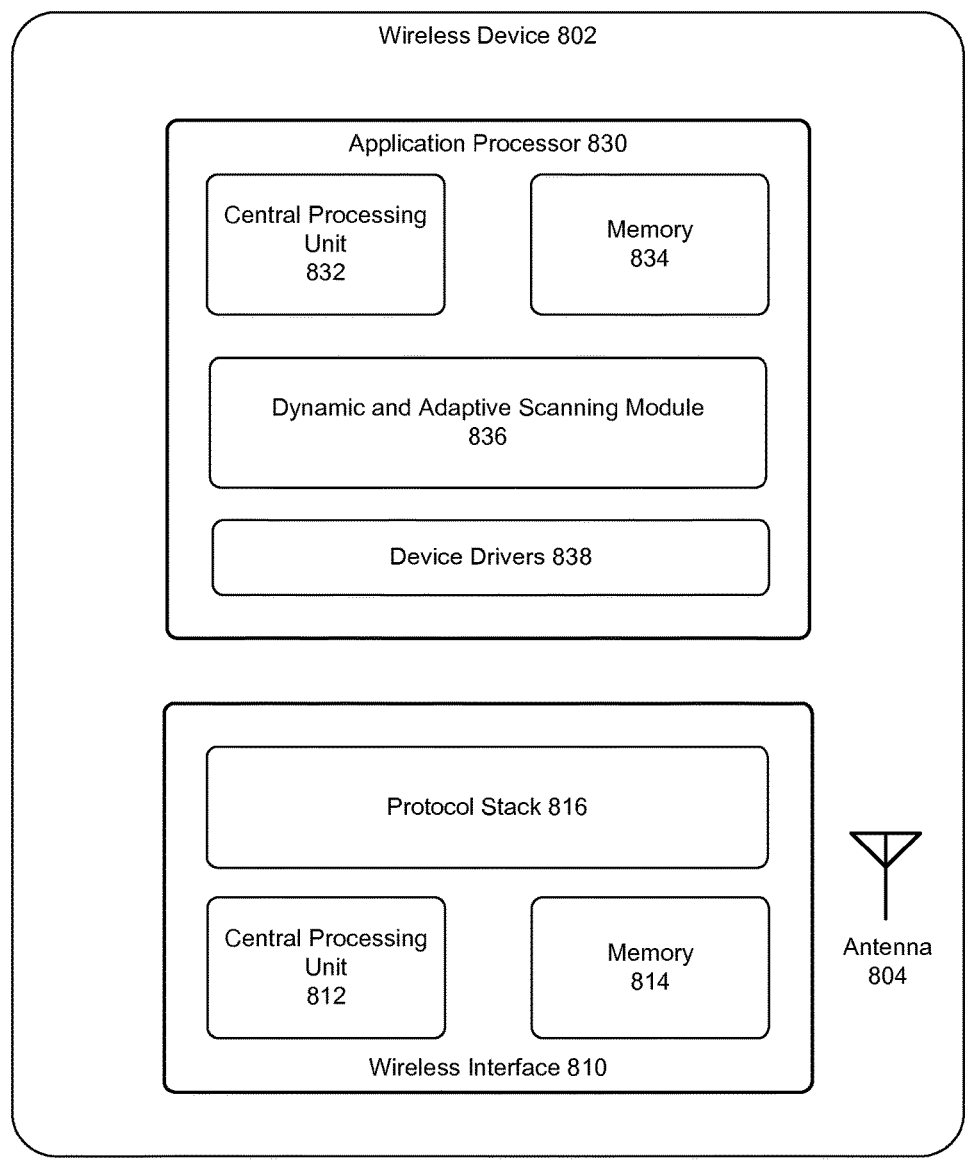
FIG. 8 is a block diagram of a device configured to perform dynamic and adaptive channel scans, in accordance with some embodiments.

FIG. 8 is a block diagram of a device that may implement dynamic adaptive scanning, according to some embodiments. Some components of device 802 are omitted (e.g., non-volatile storage, display screen, input controls, speaker(s)) in the interest of clarity.

Wireless device 802 may be a computing device, a communication device or a hybrid device, and is capable of wireless communications using communication resources that include a radio and antenna 804. Device 802 includes application processor 830 and wireless interface 810, which may be a wireless network interface controller (WNIC) in some implementations Wireless interface 810 includes CPU 812, memory 814 and protocol stack or operating software 816. The wireless interface may also include other components, not depicted in FIG. 8, for implementing wireless communications and related functionality. Such other components may include, but are not limited to: specific-purpose DSP (Digital Signal Processor) circuitry for implementing baseband signal processing, physical layer processing, data link layer processing and/or other processing; one or more digital to analog converters (DACs); one or more analog to digital converters (ADCs); radio frequency (RF) circuitry (e.g., one or more amplifiers, mixers, filters, phase lock loops, oscillators); and/or other components.

Wireless interface 810 is coupled to antenna 804. When device 802 transmits data wirelessly, such transmission may involve wireless interface 810 providing signals to antenna 804, which are then transmitted by the antenna as radio frequency (RF) or other electromagnetic signals. Similarly, when device 802 receives data wirelessly, such reception may involve the antenna receiving RF or other electromagnetic signals and providing the signals to wireless interface 810 for processing.

Application processor 830 includes CPU 832, memory 834, dynamic and adaptive scanning module code 836 and device driver(s) 838.

In some embodiments, module 836 may be or may incorporate upper layers of a protocol stack that includes protocol stack 816 of the wireless interface. Program code of module 836 is configured to perform one or more methods of dynamic, adaptive channel scanning, and enables configuration of a method of such scanning (e.g., to specify or select operating parameters). Thus, during operation of device 802, program code from module 836 may be loaded into memory 834 for execution by CPU 832, with operation of wireless interface 810 being controlled via device drivers 838. Application processor 830 may also include other program code for communication functions associated with Wi-Fi communications, peer-to-peer networking, Bluetooth operations, etc.

In some embodiments, power conservation is enhanced by offloading control of the device's radio to wireless interface 810. For example, when the device applies a low-power mode of operation (during a scan cycle and/or between scan cycles), operating parameters and instructions may be copied to memory 814 so that CPU 812 can continue the dynamic, adaptive channel scanning without assistance from or cooperation with CPU 832 of application processor 830. The wireless interface may be able to change operating parameters in these embodiments (e.g., to increase rest times), or application processor 830 may have to be woken if the parameters need to be changed.

An environment in which some embodiments are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments have been presented for purposes of illustration and description only. They are not intended to be exhaustive or to limit the disclosure to the forms disclosed. Accordingly, many modifications and variations will be apparent to practitioners skilled in the art.

What is claimed is:

1. A device, comprising:
a processor; and
a wireless interface, wherein the processor, through the wireless interface, is configured to:
scan on one or more communication channels during a scan cycle, wherein the scan cycle is followed by a rest cycle having a first rest cycle duration;
determine whether at least one event is detected during the scan cycle;
in response to a determination that the at least one event is detected, set the rest cycle to a second rest cycle duration, the second rest cycle duration being shorter than the first rest cycle duration; and
in response to a determination that no event is detected, increase the first rest cycle duration by multiplying the first rest cycle duration by a rest cycle multiplier up to a maximum rest cycle duration.

2. The device of claim 1, wherein, during the scan cycle, the processor is further configured to alternate scan intervals for scanning the one or more communication channels with rest intervals having a first rest interval duration.

3. The device of claim 2, wherein the processor is further configured to:
in response to the determination that no event is detected, increase the first rest interval duration.

4. The device of claim 2, wherein the processor is further configured to:
in response to the determination that the at least one event is detected, set the first rest interval duration to a second rest interval duration, the second rest interval duration being shorter than the first rest interval duration.

5. The device of claim 1, wherein the processor is configured to enter a low-power mode of operation during the rest cycle in response to the device not having a predetermined active communication connection.

6. The device of claim 1, wherein the at least one event comprises the processor receiving a scan request from an application or a service executing on the device.

7. The device of claim 1, further comprising:
one or more sensors configured to sense at least one value, wherein the at least one event comprises the processor receiving, from the one or more sensors, an indication of one or more fluctuations in the at least one sensed value.

8. A method, comprising:
scanning, using a processor and a wireless interface in a device, one or more communication channels during a scan cycle, wherein the scan cycle is followed by a rest cycle having a first rest cycle duration;
determining whether the scan cycle is completed;
in response to a determination that the scan cycle is complete, determining whether at least one event is detected during the scan cycle, wherein the at least one event comprises indications of corresponding activities on the device;
in response to a determination that the at least one event is detected, setting the rest cycle to a second rest cycle duration, the second rest cycle duration being shorter than the first rest cycle duration; and
in response to a determination that no event is detected, increasing the first rest cycle duration by multiplying the first rest cycle duration by a rest cycle multiplier up to a maximum rest cycle duration.

9. The method of claim 8, further comprising:
during the scan cycle, alternating scan intervals for scanning the one or more communication channels with rest intervals having a first rest interval duration.

10. The method of claim 9, further comprising:
in response to the determination that no event is detected, increasing the first rest interval duration up to a maximum rest interval duration.

11. The method of claim 9, further comprising:
in response to the determination that the at least one event is detected, setting the first rest interval duration to a second rest interval duration, second rest interval duration being shorter than the first rest interval duration.

12. The method of claim 8, further comprising:
entering a low-power mode of operation during the rest cycle in response to the device not having a predetermined active communication connection.

13. The method of claim 8, wherein the determining whether at least one event is detected during the scan cycle comprises determining whether a scan request from an application or service executing on the device is received.

14. The method of claim 8, wherein the determining whether at least one event is detected during the scan cycle comprises determining whether an indication of one or more fluctuations in sensed values are received from the one or more sensors.

15. A non-transitory computer readable storage medium storing program code that, when executed by a processor in a device, causes the processor to perform a method comprising:
scanning one or more communication channels during a scan cycle, wherein the scan cycle is followed by a rest cycle having a first rest cycle duration;
determining whether at least one event is detected during the scan cycle, wherein the at least one event comprises indications of corresponding activities on the device;
in response to a determination that the at least one event is detected, setting the rest cycle to a second rest cycle duration, the second rest cycle duration being shorter than the first rest cycle duration; and
in response to a determination that no event is detected; increasing the first rest cycle duration by multiplying the first rest cycle duration by a rest cycle multiplier up to a maximum rest cycle duration.

16. The non-transitory computer readable storage medium of claim 15, wherein the method further comprising:
during the scan cycle, alternating scan intervals for scanning the one or more communication channels with rest intervals having a first rest interval duration;
in response to the determination that no event is detected, increasing the first rest interval duration up to a maximum rest interval duration; and
in response to the determination that the at least one event is detected, setting the first rest interval duration to a second rest interval duration, second rest interval duration being shorter than the first rest interval duration.

* * * * *

UNITED STATES PATENT AND TRADEMARK OFFICE
CERTIFICATE OF CORRECTION

PATENT NO. : 10,034,224 B2
APPLICATION NO. : 14/816908
DATED : July 24, 2018
INVENTOR(S) : Borges et al.

Page 1 of 1

It is certified that error appears in the above-identified patent and that said Letters Patent is hereby corrected as shown below:

In Column 12, Lines 47-48, replace "the scan cycle is complete" with --the scan cycle is completed--.

In Column 13, Line 4, replace "duration, second rest interval" with --duration, the second rest interval--.

Signed and Sealed this
Twenty-ninth Day of January, 2019

Andrei Iancu
*Director of the United States Patent and Trademark Office*